United States Patent
Torok

(10) Patent No.: US 7,116,030 B2
(45) Date of Patent: Oct. 3, 2006

(54) HIGH-SPEED SYNCHRONOUS MOTOR

(76) Inventor: Vilmos Torok, via per Arogno 7, Campione D'Italia (CH) CH-6911

( * ) Notice: Subject to any disclaimer, the term of this patent is extended or adjusted under 35 U.S.C. 154(b) by 0 days.

(21) Appl. No.: 10/513,135

(22) PCT Filed: Apr. 30, 2003

(86) PCT No.: PCT/SE03/00701

§ 371 (c)(1),
(2), (4) Date: Nov. 1, 2004

(87) PCT Pub. No.: WO03/094326

PCT Pub. Date: Nov. 13, 2003

(65) Prior Publication Data

US 2005/0162031 A1  Jul. 28, 2005

(30) Foreign Application Priority Data

Apr. 30, 2002  (SE) ..................... 0201298

(51) Int. Cl.
*H02K 1/00* (2006.01)

(52) U.S. Cl. ............ 310/216; 310/166; 310/254; 310/261

(58) Field of Classification Search .......... 310/168, 310/187, 171, 166, 261, 254, 269; 318/254
See application file for complete search history.

(56) References Cited

U.S. PATENT DOCUMENTS

| 2,630,561 | A | * | 3/1953 | Mueller | 336/135 |
| 3,062,979 | A | * | 11/1962 | Jarret et al. | 310/168 |
| 3,956,678 | A | * | 5/1976 | Byrne et al. | 318/138 |
| 4,197,488 | A | * | 4/1980 | Kant | 318/115 |
| 4,698,537 | A | | 10/1987 | Byrne et al. | |
| 6,127,764 | A | | 10/2000 | Torok | |
| 6,483,212 | B1 | | 11/2002 | Mimura et al. | |

FOREIGN PATENT DOCUMENTS

DE  100 49 343 A1  4/2001

* cited by examiner

Primary Examiner—Thanh Lam
(74) Attorney, Agent, or Firm—Browdy and Neimark, PLLC

(57) ABSTRACT

An electric motor for operation at very high speeds comprises a ferromagnetic stator (11), a ferromagnetic rotor (13) having a rotor core (16) with a plurality of reluctance poles (17) spaced from the stator by an air gap (G), and a rotor shaft (14) supporting the rotor core for rotation in the stator, and a winding (12) on the stator for producing a multipolar magnetic field continuously travelling along the air gap and linking the stator with the reluctance poles of the rotor. At least a part of the outer portion of each reluctance pole (17) of the rotor core (16) forms a saturable surface layer having a saturation flux density which is lower than the flux density in the air gap (G) that saturates the teeth (11A) of the stator (11). The rotor core (16), including the reluctance poles (17), and the rotor shaft (14) are formed from a single solid piece of ferromagnetic material. Preferably, the surface saturable layer includes a multiplicity of thin fins (18) separated by deep and narrow circumferentially extending grooves (19).

12 Claims, 4 Drawing Sheets

HIGH-SPEED SYNCHRONOUS MOTOR

This invention relates to synchronous electrical motors and more particularly to reluctance motors having a toothed ferromagnetic stator with a winding producing a rotating magnetic field and a rotor with ferromagnetic reluctance poles.

U.S. Pat. No. 6,127,764 discloses a prior art reluctance motor of this kind in which permanent magnets alternate with the reluctance poles.

Over at least part of their circumferential length, the reluctance poles of the prior art motor have a saturation flux density at their surface facing the air gap between the stator and the rotor that is lower than the flux density in the air gap that saturates the stator teeth. In other words, the reluctance poles are saturated before the stator teeth become saturated.

As described in U.S. Pat. No. 6,127,764, the desired lower saturation flux density of the rotor reluctance poles relative to that of the stator teeth can be achieved in different ways. For example, the rotor laminations, or at least some of them, may be shortened or recessed adjacent to the air gap along part of or throughout the circumferential length of the reluctance poles such that the radially outer portion or surface layer of the rotor poles is non-solid, being formed not exclusively of a ferromagnetic material, but also of air or a material that is magnetically similar to air. As "seen" by the stator field, the non-solid surface layer of the rotor poles appears as a homogenous ferromagnetic body whose saturation flux density is reduced in comparison with the saturation flux density of the individual rotor laminations and whose saturation occurs before the stator teeth become saturated.

The required reduced saturation flux density of the non-solid surface layer is achieved by a suitable choice of the percentage of ferromagnetic material included in the layer. As a result of the limitation of the flux density in the air gap by such a non-solid saturable surface layer of the rotor poles, the torque developed by the reluctance poles can be almost doubled compared with full-iron reluctance poles, which require a wider air gap for a corresponding reduction of the flux density in the air gap.

In a variant of the prior art motor which is described but not illustrated in U.S. Pat. No. 6,127,764, the permanent magnets are omitted, the rotor being otherwise substantially the same. The omission of the permanent magnets results in a significantly lower torque of the motor. This disadvantage notwithstanding, this variant is advantageous in that it is very sturdy so that it can operate at much higher speeds than a rotor equipped with permanent magnets. However, at very high speeds, such as several tens of thousands rpm, other problems occur. At extremely high peripheral rotor speeds, e.g. in the range of 300–400 m/min, the prior art rotor may be unable to withstand the centrifugal forces.

For any given type of rotor design, the maximum useful power of the motor is roughly proportional to the cubed maximum allowable peripheral rotor speed and inversely proportional to the squared rotational rotor speed (rotor rpm). For any very high-speed application, the rotational speed is given and the maximum achievable power is thus proportional to the cube of the maximum allowable peripheral speed multiplied by a factor characterising the rotor type (e.g. a permanent magnet rotor, a squirrel cage rotor, or a rotor according to the present invention). Because of the cubic relationship of the power to the peripheral speed, that speed is the most important factor in the pursuit of high useful power.

As an example of a field where both high power and peripheral rotor speeds in the above-mentioned range are desired, electrically driven rotary tools for high-speed grinding or other types of machining of workpieces may be mentioned.

It is therefore an object of the present invention to provide a rotating-field reluctance motor which is provided with surface saturable rotor reluctance poles according to the variant of the prior art motor described above which is capable of operation in very high speed ranges, extending into the supersonic range of peripheral speeds, e.g. peripheral rotor speeds approaching the upper end of the range mentioned above, without developing intolerable eddy current losses along the rotor surface and being of a strength such that it can withstand the centrifugal forces at such speeds.

To this end, in the motor of the present invention, the ferromagnetic rotor, including its salient poles, and the shaft supporting the rotor for rotation relative to the stator are made from a single solid piece of high-strength steel. On the pole surface facing the air gap, at least a part of the radially outer portion of each reluctance pole of the rotor forms a magnetically saturable surface layer having a saturation flux density which is lower than the flux density in the air gap that saturates the teeth of the stator.

In a preferred embodiment of the invention, the magnetically saturable surface layer includes a multiplicity of thin fins separated by deep and narrow circumferentially extending grooves. However, although for convenience the following part of the description makes particular reference to this preferred embodiment, it is to be understood that the magnetically saturable surface layer can have configurations other than that of the preferred embodiment. Factors to be taken into consideration in the design of the magnetically saturable surface layer include eddy current and air friction losses.

In the preferred embodiment, the grooves act as an electrical insulation between the fins and also, together with the fins, determine the percentage of ferromagnetic material of the magnetically saturable surface layer and thereby the saturation flux density of that layer as seen or experienced by the stator field. The magnetically saturable surface layer comprising the fins and the grooves separating them has the same magnetic properties as a magnetically saturable surface layer formed by steel laminations as described in U.S. Pat. No. 6,127,764 and thereby provides the advantageous effect described in that patent and mentioned above.

For flux densities in the air gap which exceed the value at which the fins of the saturable surface layer reach saturation, the magnetic behaviour of the saturable surface layer is similar to that of a permanent magnet with a relative permeability near unity and of a height nearly equal to the height of the fins. If the magnetising field is stronger than that which is just about capable of saturating the saturable surface layer, the saturable surface layer is just as effective as a permanent magnet in limiting the flux density in the air gap.

In the rotor of the motor according to the invention, eddy currents losses in the rotor are confined substantially to the saturable surface layer and thus do not extend to any substantial degree into the solid portion of the rotor inwardly of the fins, because the fins formed in the grooved part of the rotor gradually level out the fluctuations of the flux density caused by the slotted stator surface so that almost no such fluctuations occur in the solid rotor portion.

Another advantage that results from the non-solid saturable surface layer of the rotor poles is the reduced weight of that layer, which constitutes the radially outermost part of the rotor. With the extreme rotational speeds contemplated for the motor according to the invention, the reduced weight means a significant reduction of the centrifugal forces acting on the rotor compared with a corresponding conventional rotor with a solid surface layer and, consequently, means a higher allowable peripheral speed.

A further advantage of the motor according to the present invention is that its all-steel rotor may operate at a considerably higher temperature than, for example, a rotor carrying permanent magnets and a composite carbon fibre bandage securing the permanent magnets in position on the rotor. A higher allowable rotor temperature also allows the stator to operate at a higher temperature, and this in turn may permit a higher power rating of the motor. Moreover, in a motor operating in an evacuated environment to have reduced air friction losses, air cooling of the motor is absent or severely reduced. In such a case an elevated allowable rotor temperature represents an important advantage.

The integration of the rotor shaft and the part of the rotor which is provided with the reluctance poles in one single piece of steel which is solid with the exception of the portion of the rotor forming the magnetically saturable surface layer of fins and grooves, that is, elements of a ferromagnetic material and air-filled voids, results in a strength of the rotor with regard to the ability to withstand the centrifugal stresses which is vastly greater than that of the prior art rotor in which the corresponding rotor part is formed of steel laminations with a bore to accommodate a separate rotor shaft.

Making the rotor and the rotor shaft from a single solid piece also results in an increased stiffness, and thereby an increased critical speed, of the rotor-shaft combination in comparison with the stiffness and the critical speed of the prior art motor having the same rotor diameter and rotor length. Thus, for a given rotor diameter, the motor according to the invention can be provided with a longer rotor, and accordingly can have a higher power, than a comparable prior art motor, without infringing the common requirement for a first critical rotor speed exceeding the maximum operating speed by a safety margin.

The invention will be described in greater detail below with reference to the accompanying diagrammatic drawings which show an embodiment of the invention by way of example.

Figure 1:
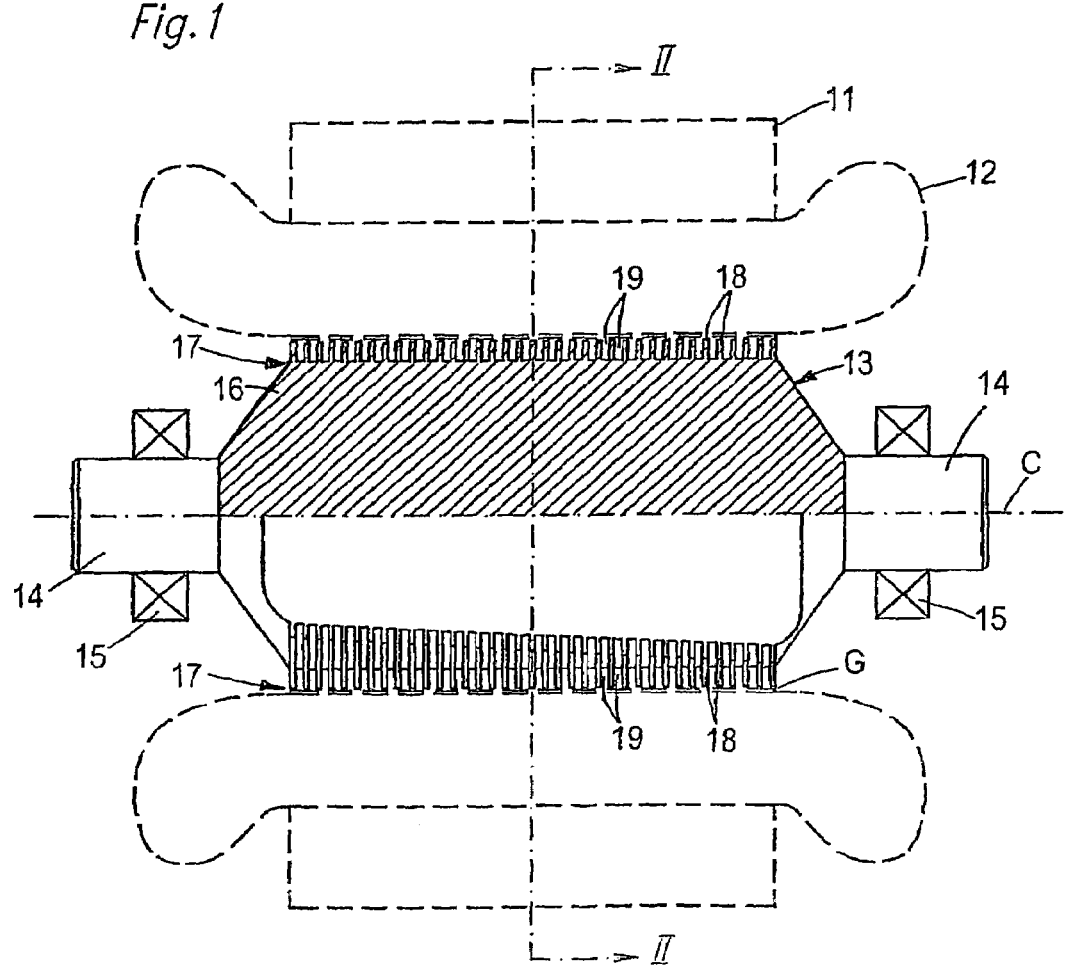
FIG. 1 is a diagrammatic side view of a motor according to the invention showing the upper half of the rotor in longitudinal section, the outline of the stator including the winding being shown in broken lines.
Figure 5:
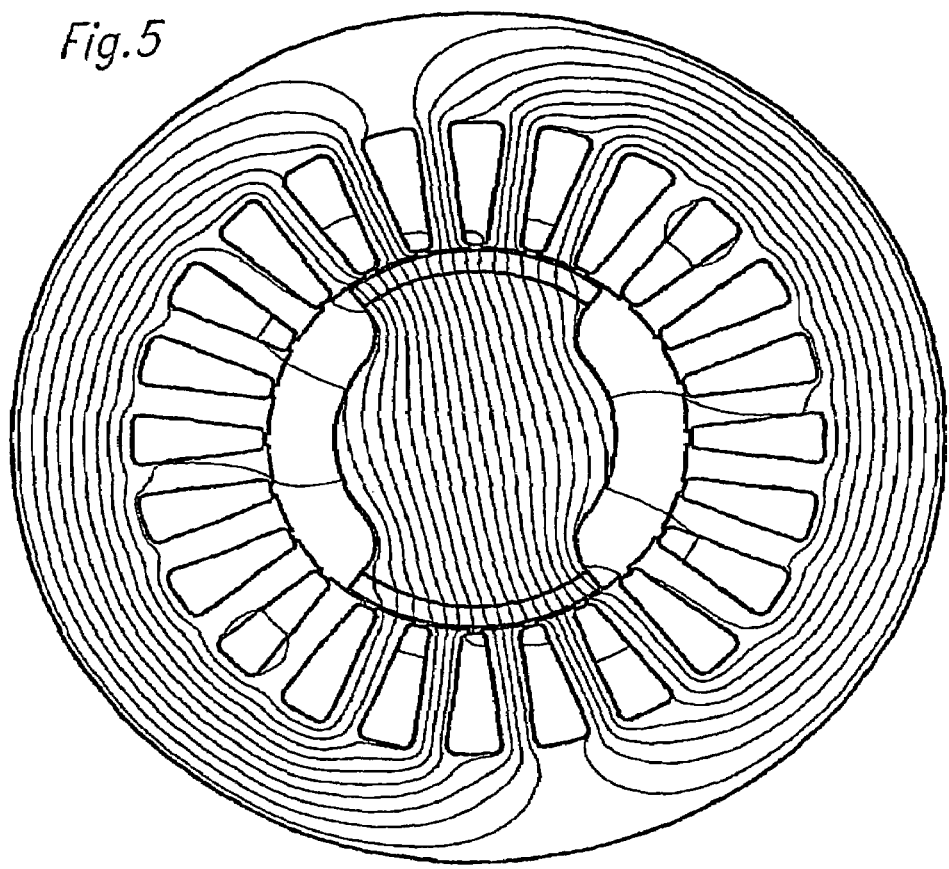
Figure 6:
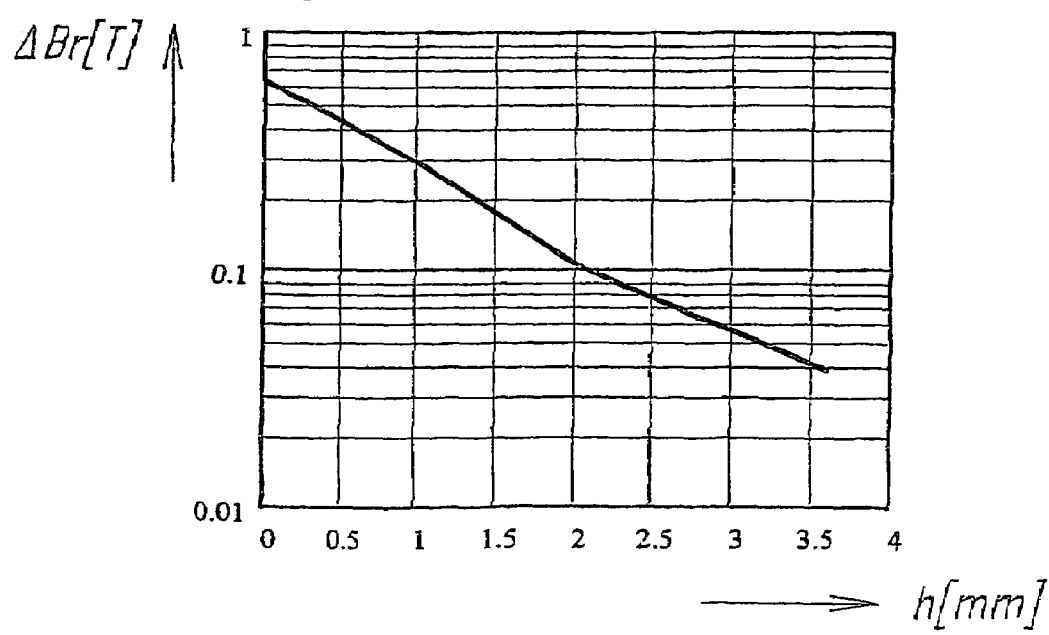

FIG. 5 is a diagrammatic cross-sectional view of the motor of FIG. 1, including magnetic field lines in operation of the motor (hatching of the rotor is omitted in the interest of clarity); and FIG. 6 is a diagram showing the flux density variations in the magnetically saturable surface layer of the rotor poles as a function of the depth beneath the circumferential surface of the rotor poles; these flux density variations in the saturable surface layer are largely proportional to the flux density variations in the fins of the saturable surface layer.

As illustrated in FIGS. 1 to 4, the exemplary embodiment of a rotary motor according to the invention comprises a stationary motor part or stator 11 indicated in broken lines and including a polyphase winding 12 adapted to produce a rotating multipolar (even number of poles) magnetic field and disposed in stator slots separated by circumferentially spaced-apart stator teeth 11A, a rotating motor part or rotor 13 which includes integral stub shafts 14 supporting the rotor for rotation relative to the stator 11 about a rotor axis C in bearings 15 mounted in the stator. A narrow cylindrical air gap G separates the rotor 13 from the stator 11. Apart from the rotor 13, the motor may be of a substantially conventional design so that only the rotor has to be described in detail.

The rotor 13, including the stub shafts 14, is constructed from a single solid piece of ferromagnetic material, preferably high-strength steel, such as steel having a yield strength of at least about 500 N/mm$^2$ (72,500 pounds per square inch).

Figure 2:
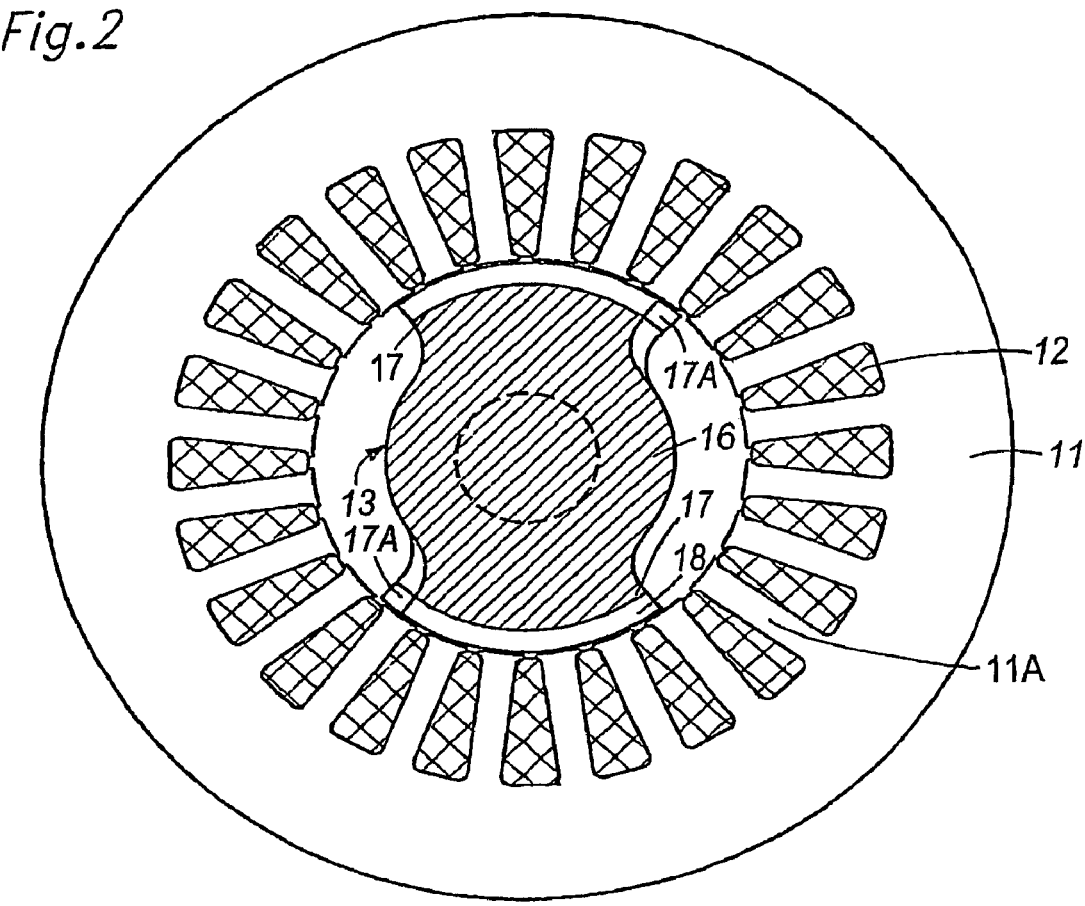
FIG. 2 is a cross-sectional view of the motor on line II—II of FIG. 1.
Figure 3:
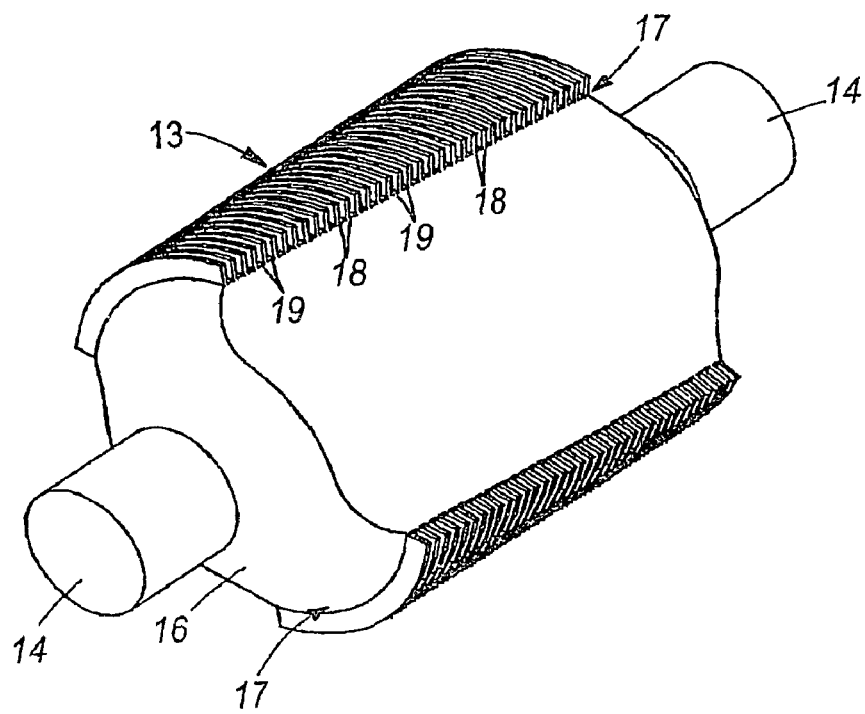
FIG. 3 is a perspective view of the rotor.

As shown in FIGS. 2 and 3, the rotor 13 comprises a rotor core 16 provided with salient poles 17 in a number equal to the number of poles of the rotating magnetic stator field—as shown in FIG. 5 there are two field poles and two rotor poles—which are diametrically opposite to one another and axially coextensive with the outer portion of the rotor core and of uniform circumferential length.

Figure 4:
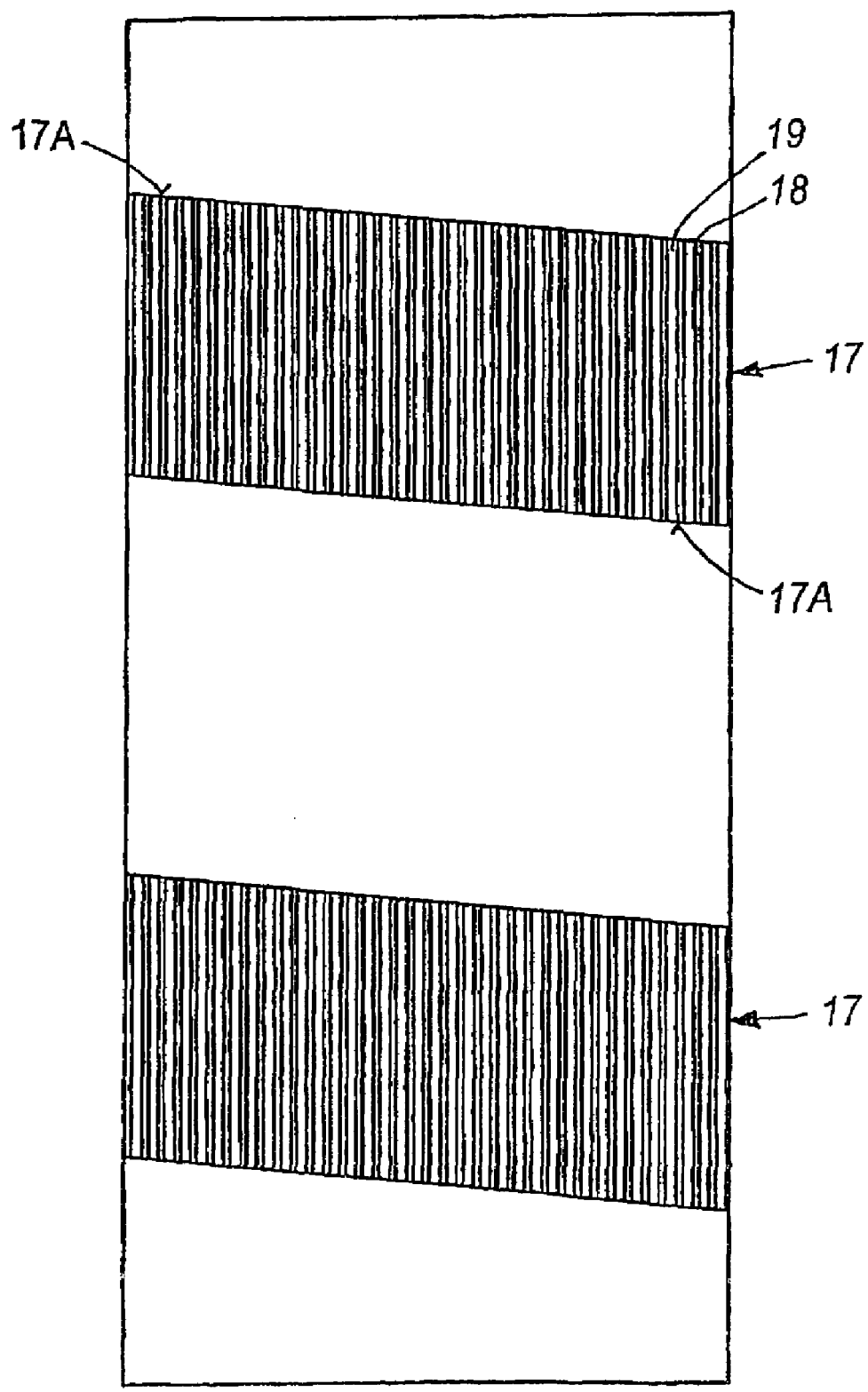
FIG. 4 is a developed view of the circumferential surface of the rotor.

As is best seen in FIG. 4, the poles 17 are skewed so that their longitudinal edges 17A include an angle with the axial direction. Alternatively, if the winding slots of the stator 11 are suitably skewed, the rotor poles 17 may be non-skewed, the choice between the alternatives can be made in dependence on the available manufacturing possibilities. A further possibility would be to make the skewing of the rotor poles 17 in steps by subdividing each rotor pole axially into a number of pole sections which are suitably offset circumferentially with respect to one another. These pole sections may be non-skewed or have a skew angle smaller than that of the nonsubdivided poles for which they are substituted.

In accordance with the invention, the radially outer portion of at least a part of each rotor pole 17 is provided with a magnetically saturable surface layer. In the illustrated preferred embodiment of the invention, the magnetically saturable surface layer is formed of a multiplicity of thin fins 18 and deep and narrow grooves 19 separating the fins. These fins 18 and grooves 19 extend circumferentially throughout the poles. However, they may alternatively be provided only over a part of the circumferential length of the poles. In the illustrated embodiment, the height of the fins 18 and thus the depth of the grooves 19 are constant over both the circumferential and the axial length of the poles as shown in FIG. 2, but this is not necessary. For example, if the motor is intended for a single or preferential direction of rotation, the height of the fins and the depth of the grooves may advantageously vary circumferentially.

The height and thickness of the fins 18 and the depth and width of the grooves 19 are dimensions which have an influence on the performance of the motor. Various criteria can be applied to the determination of these dimensions, the overall requirement being that of establishing a suitable level of saturation flux density of the saturable surface layer, limiting eddy current losses in the saturable surface layer (in the fins) to an acceptable level, and substantially eliminating the eddy current losses in the solid part of the rotor.

As indicated above, the relative dimensions of the fins and the spaces separating the fins, especially the ratio of the thickness of the fins to the width of the grooves separating them, should be selected so as to ensure that the saturable surface layer reaches saturation before the stator teeth become saturated. As a general rule, this means that the volumetric percentage of ferromagnetic material in that layer should be between 30 and 60%, preferably between 35 and 50%. In the illustrated and described embodiment, the combined volume of the fins is 40% of the total volume of the saturable steel/air surface layer. It is fairly simple in each given case to determine the suitable percentage, with due consideration of, among other things, the saturation flux densities of the ferromagnetic materials used in the stator and the rotor, and once the percentage has been determined, the thickness of the fins and the width of the grooves can readily be determined to provide the desired steel/air percentage.

Fortunately, the height of the fins required for an effective limitation of the flux density in the air gap G is more than adequate for a reduction of the amplitude of the flux density fluctuations at the roots of the fins to a insignificant level, because the amplitude of the flux density fluctuations in the saturable surface layer decreases more or less exponentially with the depth beneath the pole surface defined by the tips of the fins. This is illustrated by the diagram in FIG. 6 in which the vertical axis shows the amplitude of the flux density fluctuations in the saturable surface layer and the horizontal axis shows the depth, as measured in millimetres, at which the flux density fluctuations in the saturable surface layer are measured. The diagram is representative of a motor substantially as shown in FIGS. 1–4 rated at 100 kW and 100.000 rpm and having a rotor 72 mm in diameter and an axial pole length of about 90 mm. The thickness of the fins is 0.4 mm and the width and depth of the grooves which separate the fins are 0.6 mm and 4 mm, respectively.

From the diagram it is seen that at a depth in the fins of about 2.7 mm, the fluctuation amplitude is only about one tenth of that at the rotor surface. Accordingly, the specific eddy current losses (measured in watts per kilogram) at that depth are only about 1 percent of the losses at the surface of the poles. This means that the losses caused by fluctuations which occur inwardly of the fins are only a very small fraction of the losses at the surface of the poles. In other words, although the rotor core 16 is not laminated, it accounts only for an extremely small proportion of the eddy current losses.

In the illustrated embodiment, the thickness of the fins 18 is less than the width of the air gap G as is desired. The width of the grooves 19 likewise should preferably be less than the width of the air gap G, although in the illustrated embodiment it is slightly greater to facilitate the machining of the grooves. Preferably, the depth of the grooves 19 should be several times the axial centre-to-centre distance or pitch of the fins 18. In the illustrated embodiment, the depth of the grooves and thus the height of the fins, are 4 times the just-mentioned distance.

Any suitable available technique for forming the grooves and fins in the rotor poles can be used, such as electron discharge machining (also known as electric spark or electroerosive machining) and cutting with a saw.

The invention claimed is:

1. An electric motor comprising
    a ferromagnetic stator (11) having a plurality of teeth (11A) spaced apart along a circumferentially extending line,
    a ferromagnetic rotor (13) having a rotor core (16) with a plurality of reluctance poles (17) which are spaced apart along a circumferentially extending line in confronting relation with the stator teeth and spaced from the stator teeth by an air gap (G),
    a rotor shaft (14) supporting the rotor for rotation in the stator, and
    a winding (12) on the stator for producing a multipolar magnetic field continuously travelling along the air gap and linking the stator teeth with the reluctance poles (17) of the rotor core (16), the magnetic field having an even number of poles equal to the number of reluctance poles of the rotor;
    characterised by the combination of the following features:
    at least a part of the outer portion of each reluctance pole (17) of the rotor core (16) forms a magnetically saturable surface layer having a saturation flux density which is lower than the flux density in the air gap (G) which saturates the teeth (11A) of the stator (11), and
    the rotor core (16), including the reluctance poles (17) with the associated magnetically saturable surface layer of each pole, and the rotor shaft (14) are formed from a single solid piece of ferromagnetic material.

2. An electric motor as claimed in claim 1 in which the magnetically saturable surface layer includes a multiplicity of thin fins (18) separated by deep and narrow circumferentially extending grooves (19).

3. An electric motor as claimed in claim 2 in which the thickness of the fins (18) is smaller than the width of the air gap (G).

4. An electric motor as claimed in claim 2 or 3 in which the thickness of the fins (18) is smaller than the width of the grooves (19).

5. An electric motor as claimed in claim 1 in which the volume of ferromagnetic material in the magnetically saturable surface layer of each reluctance pole is between 30 and 60 percent of the total volume occupied by the magnetically saturable surface layer.

6. An electric motor as claimed in claim 1 in which the combined volume of ferromagnetic material in the fins (18) is between 30 and 60 percent of the total volume occupied by the surface layer of the reluctance poles (17) that is jointly formed of the fins (18) and the grooves (19).

7. An electric motor as claimed in claim 2 in which the combined volume of ferromagnetic material in the fins (18) is between 30 and 60 percent of the total volume occupied by the surface layer of the reluctance poles (17) that is jointly formed of the fins (18) and the grooves (19).

8. An electric motor as claimed in claim 3 in which the combined volume of ferromagnetic material in the fins (18) is between 30 and 60 percent of the total volume occupied by the surface layer of the reluctance poles (17) that is jointly formed of the fins (18) and the grooves (19).

9. An electric motor as claimed in claim 1 in which the volume of ferromagnetic material in the magnetically saturable surface layer of each reluctance pole is between 35 and 50 percent of the total volume occupied by the magnetically saturable surface layer.

10. An electric motor as claimed in claim 1 in which the combined volume of ferromagnetic material in the fins (18) is between 35 and 50 percent of the total volume occupied by the surface layer of the reluctance poles (17) that is jointly formed of the fins (18) and the grooves (19).

11. An electric motor as claimed in claim 2 in which the combined volume of ferromagnetic material in the fins (18) is between 35 and 50 percent of the total volume occupied by the surface layer of the reluctance poles (17) that is jointly formed of the fins (18) and the grooves (19).

12. An electric motor as claimed in claim 3 in which the combined volume of ferromagnetic material in the fins (18) is between 35 and 50 percent of the total volume occupied by the surface layer of the reluctance poles (17) that is jointly formed of the fins (18) and the grooves (19).

* * * * *